United States Patent
Satlewal et al.

(10) Patent No.: US 11,623,937 B2
(45) Date of Patent: Apr. 11, 2023

(54) METHOD TO VALORIZE 2G BIOETHANOL WASTE STREAMS

(71) Applicants: INDIAN OIL CORPORATION LIMITED, Maharashtra (IN); DEPARTMENT OF BIOTECHNOLOGY, New Delhi (IN)

(72) Inventors: Alok Satlewal, Faridabad (IN); Ruchi Agrawal, Faridabad (IN); Ravindra Kumar, Faridabad (IN); Ravi Prakash Gupta, Faridabad (IN); Suresh Kumar Puri, Faridabad (IN); Deepak Saxena, Faridabad (IN); Sankara Sri Venkata Ramakumar, Faridabad (IN)

(73) Assignees: INDIAN OIL CORPORATION LIMITED, Mumbai (IN); DEPARTMENT OF BIOTECHNOLOGY, New Delhi (IN)

( * ) Notice: Subject to any disclaimer, the term of this patent is extended or adjusted under 35 U.S.C. 154(b) by 122 days.

(21) Appl. No.: 17/411,722

(22) Filed: Aug. 25, 2021

(65) Prior Publication Data

US 2022/0064199 A1 Mar. 3, 2022

(30) Foreign Application Priority Data

Aug. 25, 2020 (IN) .............................. 202021036618

(51) Int. Cl.
*C07G 1/00* (2011.01)
*B01D 3/14* (2006.01)
*B01D 11/02* (2006.01)
*B01D 11/04* (2006.01)

(52) U.S. Cl.
CPC ............... *C07G 1/00* (2013.01); *B01D 3/143* (2013.01); *B01D 11/0288* (2013.01); *B01D 11/0492* (2013.01)

(58) Field of Classification Search
CPC ....... C07G 1/00; B01D 3/143; B01D 11/0288
See application file for complete search history.

(56) References Cited

U.S. PATENT DOCUMENTS

| | | |
|---|---|---|
| 4,111,928 A | 9/1978 | Holsopple |
| 8,864,941 B2 | 10/2014 | Retsina |
| 9,322,072 B2 | 4/2016 | Retsina |

FOREIGN PATENT DOCUMENTS

| | | |
|---|---|---|
| CN | 1417406 A | 5/2003 |
| ES | 2675810 B1 | 7/2018 |
| WO | 2006038863 A1 | 4/2006 |

*Primary Examiner* — Sikarl A Witherspoon
(74) *Attorney, Agent, or Firm* — Maschoff Brennan

(57) ABSTRACT

An integrated approach for utilizing waste products of 2G bio-refineries to fractionate the lignin of high purity. The present invention also provides a method of recycling of two waste products (2-G ethanol residue as the substrate (LRBR) and fusel oil/synthetic fusel oil (SFO) as one of the solvent) of the biorefineries in a beneficial manner to fractionate the lignin of high purity. The present method of separating high purity lignin comprises fractioning extractive-free lignin rich residue with a solvent, wherein the solvent is a mixture of SFO/Fusel oil and Formic acid. An optimized ratio of waste fusel oil and formic acid gave more than >85% yields of high purity lignin.

10 Claims, No Drawings

METHOD TO VALORIZE 2G BIOETHANOL WASTE STREAMS

FIELD OF THE INVENTION

The present invention discloses a method of recycling of two waste products (2-G ethanol residue as the substrate (LRBR) and fusel oil as one of the solvent) of the biorefineries in a beneficial manner to fractionate the lignin of high purity. An optimized ratio of waste fusel oil and formic acid gave more than >85% yields of high purity lignin.

BACKGROUND OF THE INVENTION

At present, lignin is mostly burned as a low-quality solid fuel to supply heat and electricity in a biorefinery. As lignin is the most abundant renewable feedstock consisting of aromatics, its valorization will enable new uses as value-added chemicals and fuels. Furthermore, biorefineries incorporating lignin conversion would share the market risk and enable a versatile, sustainable, and economical industry based on lignocellulosic biomass.

With the commercialization of the advanced biofuels, the availability of lignocellulosic bioethanol residue generated from the bio-refineries will be huge (biomass estimated at 62 million tons annually), creating a need for 2G bioethanol residue valorization. With only few commercial successes, lignin is underutilized despite the fact that it is the only natural resource for aromatic components. This is mainly because of lignin's structural complexity, heterogeneity, high polydispersity, and thermal instability. Most of the earlier studies were conducted on lignin isolated from lignocellulosic biomass or lignin obtained from pulping process used in pulp and paper industry whereas; physio-chemical properties of lignin present in 2G biorefinery residue is different and it depends heavily on the pretreatment approach.

U.S. Pat. No. 8,864,941 teaches that lignocellulosic material is fractionated to produce water insoluble native lignin and lignosulfonates in various ratios, while preserving the cellulose and hydrolyzed hemicelluloses using water, ethanol, and sulfur dioxide.

U.S. Pat. No. 9,322,072 discloses methods of improving lignin separation during biomass fractionation with an acid to release sugars and a solvent for lignin (such as ethanol). In some embodiments, a digestor is employed to fractionating a feedstock in the presence of a solvent for lignin, sulfur dioxide, and water, to produce liquor containing hemicellulose, cellulose-rich solids, and lignin. A solid additive (gypsum/lignin mixture) is added to the digestor, wherein the solid additive combines with at least a portion of the lignin.

WO2006038863 provides a method for precipitating (separation) of lignin, using small amounts of acidifying agents, whereby a lignin product or an intermediate lignin product is obtained which can be used as fuel or chemical feed stock (or as a chemical or a raw material for further refining), from a lignin containing liquid/slurry, such as black liquor.

U.S. Pat. No. 4,111,928 discloses a process for the extraction or separation of lignin from waste black cooking liquor with an organic chemical solvent (ketone: mesityl oxide, cyclohexanone, isophorone, methyl heptyl ketone, methyl amyl ketone, 2-heptanone or dimethyl-4-heptanone; ester: 2, 2, butoxy ethoxy ethyl acetate, hexylacetate, heptyl acetate, amylacetate, is-amyl acetate or phenyl acetate; aldehyde: benzaldehyde, valeraldehyde, butyraldehyde or furfural; alcohol:decyl alcohol, iso-octyl alcohol or dicyclopentadiene alcohol; chlorinated hydrocarbon:methylene chloride; ether:butyl ether, 2, 2, butoxy ethoxy ethyl acetate or polyoxypropylene extended by the addition of xylene, toluene, ethylbenzene or benzene) and the production lignin-epoxide resin.

CN 1417406 discloses a method of making cellulose pulp with organic solvent. The present invention based on that lignin is soluble in dioxane, alcohols, esters, phenols, ketone, and other organic solvent. The paper pulp making process includes mixing paper-making material with solvent and acid, ammonia, anthraquinone derivative or other catalyst; reflux soaking; mashing off, filtering to separate fiber for making paper and filtrate for producing high-purity high lignin through concentration and separation; and recovering organic solvent.

ES 2675810 relates to a process of extraction and functionalization in a single stage of the insoluble lignin present in the byproducts of the production of bioethanol by fermentation of sugars from biomass.

Present application overcomes the shortfalls of the prior arts and discloses a novel approach to process the 2-G biorefinery residue for further applications. This 2G biorefinery residue predominantly contains lignin, cellulose, ash, and extractives. To utilize this waste residue, strategically fractionation of all these components is the prerequisite. Further, fusel oil, an oily, odorous byproduct of the ethanol production process produced as a distillery waste. Present invention discloses that fusel oil and formic acid work in strong synergism to generate lignin that can be upgraded to value-added compounds through emerging lignin valorization processes.

Objectives of the Present Invention

It is a primary objective of the present invention is to provide an integrated biorefinery method to valorize waste streams and develop high value products.

It is the further objective of the present invention to provide an integrated approach to valorize bioethanol residue and distillation waste stream.

It is the further objective of the present invention to fractionate a very high purity lignin from lignin residues.

It is the further objective of the present invention to provide a method to obtain >85%, lignin with having purity >99%.

SUMMARY OF THE INVENTION

The present invention discloses a method to fractionate high purity lignin using bio-ethanol waste streams like fusel oil and lignin rich residues.

The present disclosure provides a method for separating high purity lignin from waste streams, the method comprising:
  i. removing extractives from the waste steam using by hot water treatment at 70-90° C., and repeating the step for 2-5 times;
  ii. extracting solids obtained in previous step with technical spirit or fusel oil, and repeating the step 1-2 times to obtain extractive-free lignin rich residue;
  iii. fractioning extractive-free lignin rich residue obtained in previous step with a solvent in high pressure reactor;
  iv. separating the slurry obtained in previous step into solid and liquid fractions;
  v. washing the solid fraction with solvent of step (iii), followed by washing with water; and vi. combining the wash from step (v) to liquid fraction and recovering the lignin.

In one of the aspects of the present invention, the waste steam in the method for separating high purity lignin is a bioethanol residue of the biorefineries, and extractive-free lignin rich residue is an extractive-free lignin rich bioethanol residue (LRBR).

In one of the aspects of the present invention, the organic solvents used in step (iii) of the method for separating high purity lignin is selected from methanol, ethanol, propanol, butanol, acetone, formic acid, acetic acid, propionic acid, synthetic fusel oil (SFO), fusel oil or combination thereof, and fractioning in step (iii) is at temperature of 160-200° C. and pressure of 10-12 bar.

In one of the preferred aspects of the present invention, the synthetic fusel oil used in the method for separating high purity lignin comprises of iso-amyl alcohol (55%), iso-butyl alcohol (18%), active amyl alcohol (10%), butyl alcohol (5%) propyl alcohol (5%) and Hexanol (2%).

In one of the preferred aspects of the present invention, the solvent used in the method for separating high purity lignin is a mixture of fusel oil/SFO and formic acid.

In one of the preferred aspects of the present invention, the solvent used in the method for separating high purity lignin is a mixture of fusel oil and formic acid.

In one of the preferred aspects of the present invention, the solvent used in the method for separating high purity lignin is a mixture of fusel oil and formic acid in a ratio of 1:1.

In still another aspect of the present invention, the solvent used in the method for separating high purity lignin is a mixture of SFO and formic acid in a ratio of 1:1.

In another aspect of the present invention, the method is integrated to a method for production of bioethanol in biorefineries.

DETAILED DESCRIPTION OF THE INVENTION

A more complete understanding of the present invention is available by reference to the following detailed description of aspects and embodiments of the invention. The detailed description of the invention which follows is intended to illustrate but not limit the invention.

The present invention discloses a method to fractionate high purity lignin using bio-ethanol waste streams like fusel oil and lignin rich residues. More particularly the present invention relates to an integrated approach for utilizing waste products of 2G biorefineries to fractionate the lignin of high purity.

In accordance with the present invention, lignin can be fractionated from bio-ethanol waste streams in a two-stage method. The method comprises of the following stages and steps:
1. Extractives Removal Stage:
   a. The water-soluble extractives are removed with hot water (70-90° C.) and the extraction procedure carried out multiple times (2-5 times);
   b. The solids recovered from hot-water extractions are further extracted with technical spirit or alternatively with fusel oil for further extractives removal (1-2 times).
2. Lignin Extraction Stage
   i. The fractionation of extractive-free Lignin Rich Bioethanol Residue (LRBR) is carried out at this stage.
      a) The industrial grade fusel oil and synthetic fusel oil) were evaluated for lignin solubilization.
      b) The fractionation of extractive-free LRBR was carried out in a 2.0 L high pressure reactor (HPR) equipped with a temperature controller. The extractive-free sample (50 g, oven dried) was charged in the reactor. The extractive-free sample was treated with different organic solvents, under different temperature and time conditions.
      c) The fusel oil/Synthetic Fusel Oil combined with formic acid at 1:1 ratio gave highest solubilization.
      d) Formic acid in combination with individual components of Fusel Oil can also be used for step (c).

Technical spirit is a product stream generated during the distillation process of the fermented broth generated after pretreatment of lignocellulosic biomass, enzymatic saccharification and co-fermentation.

TABLE 1

| Chemical composition of technical spirit | |
|---|---|
| Component | Content |
| Ethanol | 85.0% |
| Water | 5.0% |
| Acetic acid | 5.0% |
| Acetaldehyde | 5.0% |

In another embodiment of the present invention, lignin is fractionated from bio-ethanol waste streams in a two-stage method. The method comprises of the following stages and steps:
1. Extractives Removal Stage:
   a. The water-soluble extractives are removed with hot water (70-90° C.) and the extraction procedure carried out multiple times (2-5 times).
   b. The solids recovered from hot-water extractions are further extracted with technical spirit or alternatively with fusel oil for further extractives removal (1-2 times).
2. Lignin Extraction Stage
   i. The fractionation of extractive-free Lignin Rich Bioethanol Residue (LRBR) is carried out at this stage.
      a) The industrial grade fusel oil and synthetic fusel oil were evaluated for lignin solubilization.
      b) The fractionation of extractive-free LRBR was carried out in a 2.0 L high pressure reactor (HPR) equipped with a temperature controller. The extractive-free sample (50 g, oven dried) was charged in the reactor. The extractive-free sample was treated with different organic solvents, under different temperature and time conditions.
      c) The fusel oil/Synthetic Fusel Oil combined with formic acid at 1:1 ratio gave highest solubilization.

In an embodiment of the present invention, synthetic fusel oil can be used in accordance with the present invention. Synthetic fusel oil comprises iso-amyl alcohol (55%), iso-butyl alcohol (18%), active amyl alcohol (10%), butyl alcohol (5%) propyl alcohol (5%) and Hexanol (2%). In accordance with the present invention, organic solvents used in step (b) of Lignin Extraction Stage include, but are not limited to, methanol, ethanol, propanol, butanol, acetone, formic acid, acetic acid, propionic acid.

In another embodiment of the present invention, yield and purity of lignin is >85% and 99% respectively.

Having described the basic aspects of the present invention, the following non-limiting examples illustrate specific embodiment thereof.

Example-1

Bioethanol Residue Extractives Removal and Composition Analysis

The bioethanol residue obtained after fermentation contained extractives. These extractives include fats, proteins, nonstructural silica and inorganic and organic compounds of lignocellulosic biomass and enzymes, salts, yeast, media components which have been added during the saccharification and fermentation steps. In this invention, extractives were removed at its first step to serve a dual purpose i.e., to get rid of un-necessary burden/load during lignin valorization process and minimize the formation of impurities which might interfere with the product separation/purification procedure.

The water-soluble extractives were removed with hot water (70-90° C.) extraction procedure carried out multiple times (2-3 times) using Soxhlet. The solids recovered after hot-water extractions were then extracted with technical spirit (1-2 times) for further extractives removal (Table 2).

TABLE 2

Removal of extractives from bioethanol residues

| Sample | Extractives removal (%) |
|---|---|
| Hot water extraction | 52.31 |
| Hot water and spirit extraction | 92.58 |

Results indicated that hot water extraction led to only ~50% removal while hot water plus spirit extraction led to the removal of ~93% extractives.

The unextracted and extractive free bioethanol residue samples were then washed and air-dried for the composition analysis (Table 3) by NREL LAP (Sluiter et al.; 2008). Sugar and inhibitors concentration in the pretreatment hydrolysate were measured by HPLC (Waters Gesellschaft Gmbg, Austria) using Bio-Rad Aminex HPX-87H column (Bio-Rad, USA) coupled with refractive index (RI) and Photo Diode Array (PDA) detector at a flow rate of 0.6 ml/min at column temperature of 50° C. The mobile phase was 0.005 N $H_2SO_4$ (Agrawal et al., 2015b).

TABLE 3

Chemical composition of unextracted and extractive free bioethanol residue

| Sample | Extractives (%) | Cellulose (%) | Hemicellulose (%) | Lignin (%) | Ash (%) |
|---|---|---|---|---|---|
| Bioethanol residue | 21.8 | 24.8 | 0.9 | 32.4 | 20.8 |
| Bioethanol residue after extraction | — | 28.2 | 0 | 46.3 | 26.4 |

The chemical compositions showed that bioethanol residue is composed of high amounts of lignin and ash and contains some un-converted polysaccharides mostly cellulose. Further, the removal of extractives led to the cellulose and lignin enrichment and thus chosen for further study.

Example 2

Lignin Solubilization Using Fusel Oil.

Fusel Oil (waste generated during ethanol distillation) is composed of a mixture of higher alcohols and other organic solvents. The composition of a typical Fusel oil samples is depicted in Table 4.

TABLE 4

Chemical composition of Fusel oil (obtained from ethanol production unit)

| S.No. | Component | Content (%, v/v) |
|---|---|---|
| 1 | Iso-amyl alcohol | 55 |
| 2 | Iso-butyl alcohol | 18 |
| 3 | Active amyl alcohol (2-methyl-1-butanol) | 10 |
| 4 | Butyl alcohol | 5 |
| 5 | Propyl alcohol | 5 |
| 6 | Hexanol | 2 |
| 7 | Others (including mixture of methanol, ethanol, acids, water, metal salts, etc.) | 5 |

The industrial grade fusel oil and synthetic fusel oil or (blend prepared in laboratory by mixing its individual components i.e., iso-amyl alcohol (55%), iso-butyl alcohol (18%), active amyl alcohol (10%), butyl alcohol (5%) propyl alcohol (5%) and Hexanol (2%) named as SFO) were evaluated for lignin solubilization. Various other combinations with formic acid or ethanol were also tested (Table 5). Study was carried out in a 2.0 L high pressure reactor (HPR) (Amar Equipments, Mumbai India) equipped with temperature controller. Extractive-free bioethanol residue at 10% loading was taken as the substrate and all the experiments were conducted under similar conditions (temperature 160° C., residence time 60 min).

The slurry obtained after treatment was centrifuged to separate the solids and liquids. Solids were washed first with the same solvent used for fractionation and then with water. The wash was combined with the filtrate/liquid. The solids obtained were kept for drying while the liquid fraction was concentrated using the vacuum evaporator (R-205, Büchi, Bern, Switzerland). Mass balance was done for both the fractions after oven-drying. Moisture content of samples was determined according to NREL LAP, using an infrared drier from. Lignin solubilization was calculated using following formula:

$$\text{Lignin solubilization} = \frac{\text{Weight of residue loaded (g)} - \text{Weight of solid obtained (g)}}{\text{Weight of residue loaded (g)}} \times 100$$

where, 'weight' refers to the oven-dry weight (ODW) i.e., the weight after moisture correction.

TABLE 5

Lignin solubilization yields with Fusel oil and other synthetic blends.

| S.No. | Solvent | Pressure (Bar) | Solubilization (%) | Remarks |
|---|---|---|---|---|
| 1 | Iso-amyl alcohol | 11 | 10.3 | Poor solubilization |
| 2 | Iso-butyl alcohol | 10 | 7.8 | Poor solubilization |
| 3 | SFO | 10 | 22.2 | Optimum solubilization |

TABLE 5-continued

Lignin solubilization yields with Fusel oil and other synthetic blends.

| S.No. | Solvent | Pressure (Bar) | Solubilization (%) | Remarks |
|---|---|---|---|---|
| 4 | Fusel Oil | 12 | 26.8 | Optimum solubilization |
| 5 | SFO:Ethanol (1:1) | 15 | 28.5 | Optimum solubilization |
| 6 | Fusel oil:Ethanol (1:1) | 17 | 32.7 | Optimum solubilization |
| 7 | SFO:Formic acid (1:1) | 11 | 36.4 | High solubilization with low ash |
| 8 | Fusel Oil:Formic acid (1:1) | 12 | 41.2 | High solubilization with low ash |

(*SFO means synthetic blend of iso-amyl alcohol (55%), iso-butyl alcohol (18%), active amyl alcohol (10%), butyl alcohol (5%) propyl alcohol (5%) and Hexanol (2 %)).

The fusel oil/SFO combined with formic acid at 1:1 ratio gave highest solubilization. Fusel oil plus formic acid was found to be promising with 41% lignin solubilization followed by SFO plus formic acid with 36.7% solubilization. Fusel oil thus found to have tremendous potential for applications in lignin solubilization and valorization processes.

Example 3

Temperature Optimization for Lignin Recovery

Reaction was optimized at different temperatures (120-200° C.) using fusel oil:formic acid (1:1) at 10% loading for a residence period of 1 h (Table 6). Lignin recovery and purity was estimated by compositional analysis according to the methods above.

TABLE 6

Optimization of temperature for maximum recovery of lignin

| HPR Treatments Temperature | Composition (%) (Solubilized Lignin Phase) | | | Lignin Recovery (%) |
|---|---|---|---|---|
| | Cellulose | Lignin | Ash | |
| 120° C./1 Hour | 6.7 | 55.5 | 0.9 | 49.8 |
| 140° C./1 Hour | 5.4 | 61.7 | 0.8 | 57.3 |
| 160° C./1 Hour | 2.2 | 77.6 | 0.1 | 80.0 |
| 180° C./1 Hour | 0.1 | 84.3 | 0.06 | 86.1 |
| 190° C./2 Hour | 0.0 | 71.1 | 0.09 | 52.2 |
| 200° C./1 Hour | 0.0 | 68.3 | 0.5 | 50.0 |

Based on compositional analysis, optimum temperature was found to be 180° C. with 86.1% lignin recovery and >99% purity.

The invention claimed is:

1. A method for separating high purity lignin from waste streams, the method comprising:
   i. removing extractives from the waste steam using by hot water treatment at 70-90° C., and repeating the step for 2-5 times;
   ii. extracting solids obtained in previous step with technical spirit or fusel oil, and repeating the step 1-2 times to obtain extractive-free lignin rich residue;
   iii. fractioning extractive-free lignin rich residue obtained in previous step with a solvent in high pressure reactor;
   iv. separating the slurry obtained in previous step into solid and liquid fractions,
   v. washing the solid fraction with solvent of step (iii), followed by washing with water; and
   vi. combining the wash from step (v) to liquid fraction and recovering the lignin.

2. The method as claimed in claim 1, wherein the waste steam is a bioethanol residue of the biorefineries and wherein extractive-free lignin rich residue is an extractive-free lignin rich bioethanol residue (LRBR).

3. The method as claimed in claim 1, wherein the organic solvents used in step (iii) is selected from methanol, ethanol, propanol, butanol, acetone, formic acid, acetic acid, propionic acid, synthetic fusel oil (SFO), fusel oil or combination thereof.

4. The method as claimed in claim 3, wherein the synthetic fusel oil comprises iso-amyl alcohol (55%), iso-butyl alcohol (18%), active amyl alcohol (10%), butyl alcohol (5%) propyl alcohol (5%) and Hexanol (2%).

5. The method as claimed in claim 1, wherein the solvent is a mixture of SFO and formic acid.

6. The method as claimed in claim 5, wherein the solvent is a mixture of SFO and formic acid in a ratio of 1:1.

7. The method as claimed in claim 1, wherein the solvent is a mixture of fusel oil and formic acid.

8. The method as claimed in claim 7, wherein the solvent is a mixture of fusel oil and formic acid in a ratio of 1:1.

9. The method as claimed in claim 1, wherein the fractioning in step (iii) is at temperature of 160-200° C. and pressure of 10-12 bar.

10. The method as claimed in claim 1, wherein the method is integrated to a method for production of bioethanol in biorefineries.

* * * * *